Dec. 1, 1931.   C. C. DAVIS   1,834,606
HEAT RESISTANT BELTING
Filed April 10, 1930
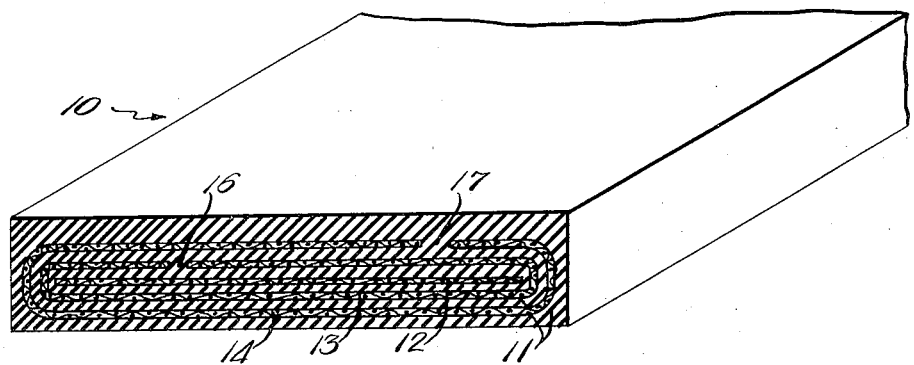
Inventor
Carroll C. Davis
by Roberts, Cushman & Woodbury
attys.

Patented Dec. 1, 1931

1,834,606

UNITED STATES PATENT OFFICE

CARROLL C. DAVIS, OF BELMONT, MASSACHUSETTS, ASSIGNOR TO BOSTON WOVEN HOSE & RUBBER COMPANY, OF CAMBRIDGE, MASSACHUSETTS, A CORPORATION OF MASSACHUSETTS

HEAT RESISTANT BELTING

Application filed April 10, 1930. Serial No. 443,203.

This invention relates to belting having a protective covering of rubber or rubber compound. Conveyor belting having a heat-resistant coating is representative of materials of this general class.

Belting is frequently made by building up a sheet from a plurality of plies of fabric which are bonded together and covered with a protective coating of rubber or rubber compound. The protective coating usually has a greater thickness on the wearing side of the sheet, as on the upper or carrying surface of a conveyor belt.

Typical uses for belting of this character are the transporting of coke, coal, ore and many different kinds of pulverized and abrasive materials. It sometimes occurs, particularly in the transporting of coke, that the materials are at a comparatively high temperature, possibly as high as 600° or 700° F., and since rubber compounds begin to decompose rapidly at temperatures above 400° F., conveyor belting which is continually exposed to these conditions is very rapidly burned out.

Objects of the invention are to provide a heat-resistant material having sufficient flexibility to serve as a covering for a conveyor belt; to provide a rubber compound for these purposes which is capable of withstanding temperatures of red-hot material without appreciable decomposition or burning of the rubber; to provide for developing a gaseous insulating medium in a rubber compound in such a manner as to protect the compound from high temperatures; to provide a rubber compound including an agent adapted to form a gaseous insulating medium at an accelerated rate on the application of heat; to provide a compound of this character adapted to form a gaseous insulating medium by an endothermic reaction; and also to provide a conveyor belt having an improved heat-resistant covering.

The single figure in the drawing is a perspective view of a conveyor belt showing an end of the belt in section.

In the drawing the conveyor belt 10 comprises a number of laminations of fabric bonded together and coated with rubber compound 11. The central lamination 12 is a relatively flat strip and the outer laminations 13 and 14 are wider strips of fabric, the strip 13 enveloping the central strip 12 and having its longitudinal edges brought substantially together at some convenient point as at 16. The outer lamination 14 is similarly disposed about the lamination 13 and has its longitudinal edges brought substantially together, preferably at a point 17, in staggered relation with respect to the meeting edges of the lamination 13. The rubber compound 11 is also applied as a coating about the plies or laminations of fabric and this compound may have a greater thickness on the upper side of the belt as shown.

In accordance with the present invention some material in the rubber compound may be utilized to prevent heat from penetrating the compound or from injuring the compound if it is penetrated, or both. As a heat-resisting agent salts may be used which are characterized by susceptibility to heat decomposition, preferably with endothermic reaction, and at or below temperatures to be encountered with evolution of a gas or gases which are non-supporters of combustion and non-combustible, and which may or may not leave a solid heat resisting residue in the matrix. Typically, zinc carbonate may be used and is the preferred material. At temperatures above 100° C. this material decomposes to liberate carbon dioxide gas and leaves behind in finely divided condition zinc oxide which is relatively refractory and of good heat insulating properties, thereby serving to protect the intervening rubber films or layers. In some cases such residue may not be required by the treatment to which the rubber compound is to be subjected so that liberation of the gas constitutes adequate protection, and in such cases completely volatile salts may be used, such as ammonium carbonate, or salts which leave a less refractory residue, such as sodium bicarbonate, or other sponging agents.

The behaviour of zinc carbonate in rendering a rubber compound capable of resisting high temperatures is due not so much to its low heat conductivity or to its low heat diffusivity as to its property of decomposing at an accelerated rate at temperatures above 100° C. and giving off carbon dioxide which is an extremely low conductor of heat. The carbon dioxide so given off is formed whenever hot material comes in contact with the compound. Thus it is formed at the point of contact of the hot material with the rubber compound surface and yields a thin, spongy, porous interface, having voids or interstices which are substantially filled with the gas and thereby form an interface having a low conductivity so that the surface only of the rubber compound is decomposed or charred by the action of the heated material. Another reason for the efficiency of zinc carbonate is that the reaction involving its decomposition is an endothermic reaction in which heat is absorbed. This has a certain effect on the heat resistant properties of the compound in that it removes some of the heat imparted by contact with the hot material. Furthermore, the carbon dioxide generated serves to smother any fire which is produced by the contact of red-hot material with the rubber composition. Typical rubber compound suitable for these purposes may have the following composition:

| | |
|---|---|
| Rubber | 30 |
| Tetramethylthiuramdisulfide | 0.5 |
| Stearic acid | 1 |
| Hard asphalt | 1 |
| Gas black | 0.5 |
| Zinc carbonate | 67 |
| | 100 |

I claim:

1. Belting having a heat-resistant coating of compound comprising rubber and an ingredient capable on the application of heat at temperatures below those at which decomposition of the rubber occurs of generating a gas within the compound.

2. Conveyor belting having a protective coating of compound on its carrying surface for protecting this surface from damage by hot material, said compound comprising rubber and an ingredient capable on the application of heat only at temperatures above those encountered in the processing of the compound and below the temperature at which decomposition of the rubber occurs of producing by an endothermic reaction a gas having a relatively low heat conductivity.

3. Conveyor belting having a protective coating of compound on its carrying surface for protecting this surface from damage by hot material, said compound comprising rubber and an ingredient capable of evolving a gas at an accelerated rate at temperatures above 100° C. and below the temperature at which decomposition of the rubber occurs.

4. Conveyor belting having a protective coating of compound on its carrying surface for protecting this surface from damage by hot material, said compound comprising rubber and an ingredient capable of producing a gas by an endothermic reaction at an accelerated rate at temperatures above 100° C. and below the temperature at which decomposition of the rubber occurs.

5. Conveyor belting having a protective coating of compound on its carrying surfaces for protecting this surface from damage by hot material, said compound comprising rubber and an ingredient capable of producing a gas by an endothermic reaction at an accelerated rate at temperatures substantially below 700° C.

6. Belting having a surface layer of heat-resistant compound adapted to support hot material, said compound comprising rubber and a carbonate decomposable at temperatures below the temperature at which decomposition of the rubber occurs.

7. Belting having a surface layer of heat-resistant compound adapted to support hot material, said compound comprising rubber and zinc carbonate.

8. Belting having layer of compound covering a surface adapted to support hot material, said compound comprising rubber and an ingredient capable on the application of heat of generating a gas at temperatures below approximately 700° C.

9. Belting having layer of compound covering a surface adapted to support hot material, said compound comprising rubber and an ingredient capable on the application of heat of generating a gas at temperatures approximately between 100° C. and 800° C.

10. Belting having layer of compound covering a surface adapted to support hot material, said compound comprising rubber and an ingredient capable on the application of heat of generating a gas by an endothermic reaction at temperatures substantially above 100° C. and below the temperature at which decomposition of the rubber occurs, the gas produced having a relatively low heat conductivity.

11. Belting having layer of compound covering a surface adapted to support hot material, said compound comprising rubber and an ingredient adapted to produce carbon dioxide on the application of heat only at temperatures above those encountered in the processing of the compound and below the temperature at which decomposition of the rubber occurs, said compound developing on the application of heat interstices adjacent its surface substantially filled with carbon dioxide gas.

12. Belting having layer of compound covering a surface adapted to support hot material, said compound comprising rubber and an ingredient adapted to produce carbon dioxide on the application of heat only at temperatures above those encountered in the processing of the compound and below the temperature at which decomposition of the rubber occurs, said compound developing on the application of heat a relatively thin, spongy, porous interface having voids therein substantially filled with carbon dioxide gas.

13. Belting having a layer of compound covering a surface adapted to support hot material, said compound comprising in parts by weight: rubber 30, tetramethylthiuramdisulfide 0.5, stearic acid 1, hard asphalt 1, gas black 0.5, zinc carbonate 67.

14. Conveyor belt or the like, comprising a surface layer of rubber compounded with a carbonate decomposable at temperatures below the temperature at which decomposition of the rubber occurs.

15. Conveyor belt or the like, comprising a surface layer of rubber compounded with zinc carbonate.

16. Conveyor belting having a protective coating of rubber characterized by containing therein a reagent decomposable to form a gas only at temperatures above those encountered during processing thereof and below the temperature at which decomposition of the rubber occurs.

17. Conveyor belting having a protective coating of rubber characterized by containing therein a reagent decomposable to form a gas and a refractory residue at temperatures above 350° C.

Signed by me at Cambridge, Mass., this 26th day of March, 1930.

CARROLL C. DAVIS.